(12) United States Patent
Folkvang

(10) Patent No.: US 8,088,286 B2
(45) Date of Patent: Jan. 3, 2012

(54) GRAVITY SEPARATOR, AND A METHOD FOR SEPARATING A MIXTURE CONTAINING WATER, OIL, AND GAS

(75) Inventor: Jorn Folkvang, Stathelle (NO)

(73) Assignee: Schlumberger Norge AS, Stavanger (NO)

( * ) Notice: Subject to any disclaimer, the term of this patent is extended or adjusted under 35 U.S.C. 154(b) by 198 days.

(21) Appl. No.: 12/084,144

(22) PCT Filed: Oct. 27, 2006

(86) PCT No.: PCT/IB2006/053978
§ 371 (c)(1),
(2), (4) Date: Aug. 31, 2009

(87) PCT Pub. No.: WO2007/049244
PCT Pub. Date: May 3, 2007

(65) Prior Publication Data
US 2010/0006517 A1    Jan. 14, 2010

(30) Foreign Application Priority Data
Oct. 28, 2005   (EP) ................................. 05388091

(51) Int. Cl.
*C02F 1/24* (2006.01)
*C02F 1/40* (2006.01)
*B01D 17/035* (2006.01)

(52) U.S. Cl. .................. 210/703; 210/188; 210/221.2; 210/519; 210/539; 210/800; 210/804; 95/263; 96/202

(58) Field of Classification Search .............. 210/703, 210/221.2, 188, 519, 539, 800, 804; 95/263; 96/202
See application file for complete search history.

(56) References Cited

U.S. PATENT DOCUMENTS

| | | | | |
|---|---|---|---|---|
| 4,094,783 A * | 6/1978 | Jackson | ........................ | 210/703 |
| 4,664,802 A * | 5/1987 | Lee | .............................. | 210/522 |
| 4,938,865 A * | 7/1990 | Jameson | ....................... | 209/168 |
| 5,080,802 A | 1/1992 | Cairo, Jr. et al. | | |
| 5,158,678 A * | 10/1992 | Broussard, Sr. | ........... | 210/221.1 |
| 5,484,534 A * | 1/1996 | Edmondson | .................. | 210/703 |
| 5,516,434 A | 5/1996 | Cairo, Jr. et al. | | |
| 5,900,154 A * | 5/1999 | Henriksen | ..................... | 210/703 |
| 6,074,557 A * | 6/2000 | Lyles et al. | .................. | 210/221.2 |
| 6,337,023 B1 * | 1/2002 | Broussard et al. | ............ | 210/703 |

FOREIGN PATENT DOCUMENTS

| | | |
|---|---|---|
| DE | 33 25 969 A1 | 1/1985 |
| EP | 0 793 987 A2 | 9/1997 |
| EP | 1 388 370 A1 | 2/2004 |
| GB | 1 327 991 | 8/1973 |
| GB | 2 093 443 A | 9/1982 |
| WO | WO 99/25454 | 5/1999 |
| WO | WO 02/066137 A1 | 8/2002 |

* cited by examiner

*Primary Examiner* — Thomas M Lithgow
(74) *Attorney, Agent, or Firm* — Jacobson Holman PLLC

(57) ABSTRACT

A gravity separator includes a vessel within which a mixture containing water, oil, and gas can separate under gravity to form vertically discrete oil and water layers and a gas phase. An inlet duct communicates with a vessel entrance for the mixture containing water, oil, and gas. The inlet duct of the gravity separator includes a gas injector that injects a gaseous medium in a volume in the range of from 0.01-1.9 $Sm^3$ of the gaseous medium per 1 $m^3$ of the mixture into the mixture containing water, oil, and gas.

14 Claims, 2 Drawing Sheets

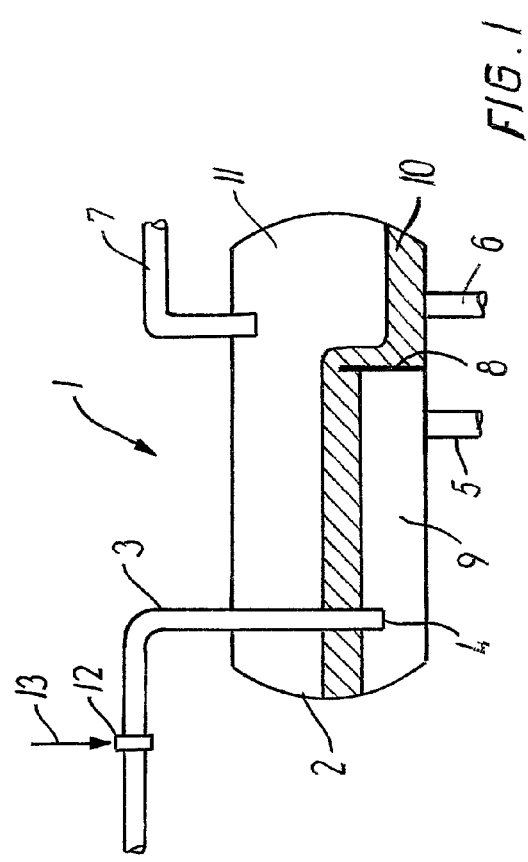
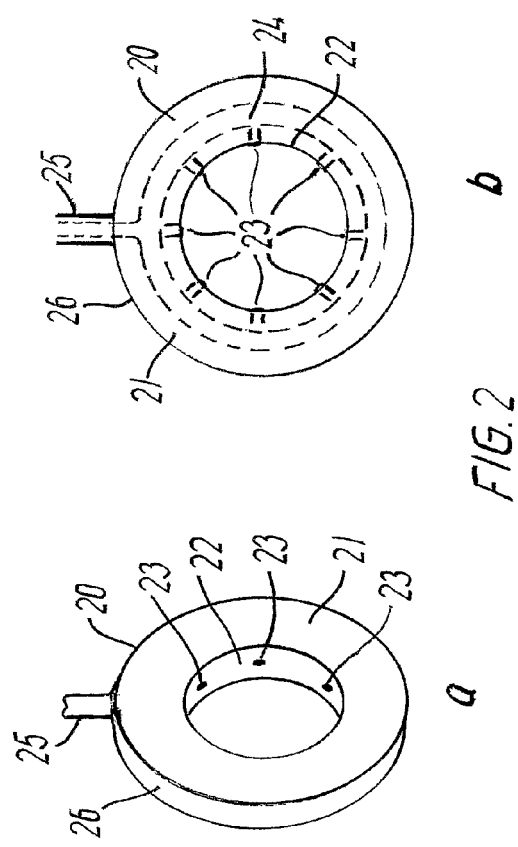

GRAVITY SEPARATOR, AND A METHOD FOR SEPARATING A MIXTURE CONTAINING WATER, OIL, AND GAS

CROSS-REFERENCE TO RELATED APPLICATION

This is a national stage of PCT/IB06/053978 filed Oct. 27, 2006 and published in English.

BACKGROUND OF THE INVENTION

1. Field of Invention

The present invention relates to a gravity separator, primarily of the kind in which a mixture flowing from an oil well, containing water, oil, and gas is separated into discrete, vertically spaced water, oil, and gas layers in a separator vessel for subsequent extraction from the vessel by way of a water outlet, oil outlet, and gas outlet, respectively.

2. Description of the Prior Art

Gravity separators have been known for many decades and have been used within the oil industry in various embodiments of which some are quite complex, including a number of static mixers and cyclones. Examples of known types of gravity separators can be found in e.g. GB 1327991 and WO 99/25454. U.S. Pat. No. 5,080,802 discloses an air flotation separator having an eductor for drawing gas into the incoming fluid. The eductor re-circulates gas collected in the uppermost section of the vessel to the incoming fluid. The separator is provided with a coalescer riser tube positioned substantially in axial alignment with the axis of the vessel, and in order to obtain optimum coalescing high masses of gas, such as a gas to water ratio of about 30% is used. Another gas flotation separator is known from U.S. Pat. No. 5,516,434, and this separator is also provided with a coalescer riser tube with filter medium. A further separator for removing dispersed oil from an oil in water emulsion is disclosed in EP 0 793 987 where gas is dissolved in the inflowing water to form an aerated solution. This solution is introduced to the separator vessel in an assembly of closely spaced matrix plates formed of oleophilic material. The use of coalescer riser tubes with filters or of matrix plates complicates the separator and involves the risk of clogging with a resulting loss of capacity. These prior art designs also require a high degree of maintenance.

SUMMARY OF THE INVENTION

An object of the present invention is to provide a gravity separator that performs effectively and with a relatively simple construction and suitable low gas consumption.

Thus, the invention relates to a gravity separator comprising a vessel within which a mixture containing water, oil, and gas can separate under gravity to form vertically discrete oil and water layers and a gas phase, the vessel having an inlet duct communicating with a vessel entrance for the mixture containing water, oil, and gas; an outlet for water; an outlet for oil; and an outlet for gas, wherein the inlet duct of the gravity separator comprises injector means injecting a gaseous medium in a volume in the range of 0.01-1.9 $Sm^3$ gaseous medium per 1 $m^3$ mixture into the mixture containing water, oil, and gas.

It has unexpectedly been found that injection in the inlet duct of such a small volume of gaseous medium into the mixture containing water, oil and gas is fully satisfactory to obtain the desired clean water phase by separation under gravity in the vessel. And by using such a small volume of gas medium, neither coalescer riser tubes with filters nor matrix plates need to be provided in the separator. The separator thus obtains a simple design of high reliability, continuously high capacity, and low maintenance costs. The content of impurities in the water phase leaving the separator may be as low as 40 ppm.

In a preferred embodiment a conduit supplying gaseous medium to the injector means re-circulates gas from the gravity separator to the injector means. The re-circulation of gas reduces any consumption of gaseous medium from an external source.

The conduit for recirculation can collect gas from a gas processing device downstream of the outlet for gaseous medium from the separator. However, in an embodiment preferred due to its simplicity the conduit supplying gaseous medium to the injector means is connected with the interior of the gravity separator at the upper part thereof.

In a further embodiment the conduit supplying re-circulated gas to the injector means is the sole supply of injection gas to the injector means. This provides several advantages. The gaseous medium injected through the injector means is automatically withdrawn from the volume of gas separated from the mixture in the vessel so that the separator becomes independent of external supply of gaseous medium. In connection with separators used in offshore oil/gas producing facilities this avoidance of an external supply of gas is highly advantageous. Apart from avoiding costs of maintenance and of provision of an external gas supply, space is also saved because storage tanks, piping etc. for an external gas supply can be dispensed with.

According to a suitable embodiment of the gravity separator, the injector means in the inlet duct is spaced apart from the vessel entrance with a spacing in the range of 0.05 to 2.00 m. This separation of the injector means and the entrance makes it possible to obtain a very good mix of the gaseous medium with the mixture containing water, oil and gas.

In order to further improve mixing, the gravity separator may be provided with a mixer, preferably a static mixer, in the inlet duct between the injector means and the vessel entrance.

In an embodiment of the gravity separator, suitable when only little space is available, the inlet duct extends from above down through the vessel to the vessel entrance where the mixture flows out into the vessel. In addition, the mixer may be located in a section of the inlet duct extending within the vessel so that a very compact design is obtained.

The present invention also relates to a method for separating a mixture containing water, oil, and gas, which method comprises the steps of: conducting the mixture to be separated via an inlet duct and a vessel entrance into a vessel, allowing the mixture in the vessel to separate under gravity into a water phase, an oil phase, and a gas phase; taking out the water phase via an outlet for water, taking out the oil phase via an outlet for oil, and taking out the gas phase via an outlet for gas; wherein a volume of gaseous medium in the range of 0.01-1.9 $Sm^3$ gaseous medium per 1 $m^3$ mixture is injected into the mixture flowing through the inlet duct to the vessel entrance.

This limited volume of injected gaseous medium has proven to sustain the separation process under gravity in the vessel and reduce costs for gas supplies without impairing the capacity of the separator. The water taken out of the vessel may optionally be further cleaned before it is returned to the reservoir. The oil and gas may optionally be further processed before it is shipped off.

In connection with the present invention the dimension $Sm^3$ is used as the volumetric unit of gaseous medium injected in relation to the volume of mixture. $Sm^3$ is standard cubic meters of the gaseous medium. $Sm^3$ is standardised within the offshore field (volume of dry gas at 15.6° C. and a pressure of 101.325 kPa).

It is possible within the limits of the present invention to inject in the range of 0.04-1.6 $Sm^3$ gaseous medium per 1 $m^3$ mixture is injected into the mixture in the inlet duct, but more preferably the volume of gaseous medium injected into the mixture in the inlet duct is limited to a volume in the range of 0.05-0.40 $Sm^3$ gaseous medium per 1 $m^3$ mixture. This volume can be withdrawn from the separator and be re-circulated to injection in the mixture in the inlet duct without any external supply of gaseous medium. The mixture flowing to the separator on the upstream side of the injector means has a sufficient content of gas to provide the separator with the necessary volume of gaseous medium. Due to injected volume of gaseous medium and the natural amount of gas phase in the mixture, the mixture flow between the injector means and the entrance to the vessel of course has an increased amount of gas phase. In a preferred method a volume of 0.05-0.15 $Sm^3$ gaseous medium per 1 $m^3$ mixture is injected into the mixture in the inlet duct, and in the most preferred method 0.08-1.2 $Sm^3$ gaseous medium per 1 $m^3$ mixture is injected into the mixture in the inlet duct.

Although the pressure in the vessel may vary and be within a wide range during operation from about 0.1 atm and upwards, it is normally preferred that the pressure in the vessel is in the range of 0.5 to 200 atm, conveniently in the range 1.0-100 atm. Adjustment of the pressure to an optimal value may improve formation of the gas phase and separation of the gas from the water and the oil.

To further improve the separation process the mixture containing water, oil, and gas is, in one embodiment, subjected to injection with one or more separation aids. Such separation aids are normally in liquid form and include flocculants, emulsifiers etc.

In a preferred embodiment of the method according to the invention the gaseous medium is re-circulated, optionally after re-extraction from the gas phase. If natural gas from the oil well is used as gaseous medium, it will normally not be necessary to re-extract it, as a part of the collected natural gas may be taken out and used as gaseous medium to be injected into the mixture containing water, oil and gas. The embodiment provides for a cost-effective method with minimum waste of resources.

BRIEF DESCRIPTION OF THE DRAWINGS

Examples of embodiments of the present invention are described in further detail in the following with reference to the highly schematic drawings, in which:

FIG. 1 illustrates a first embodiment of a gravity separator according to the present invention, FIG. 2 illustrates a nozzle system suitable for use in the gravity separator in FIG. 1.

DETAILED DESCRIPTION OF THE PREFERRED EMBODIMENTS

Figure 3:
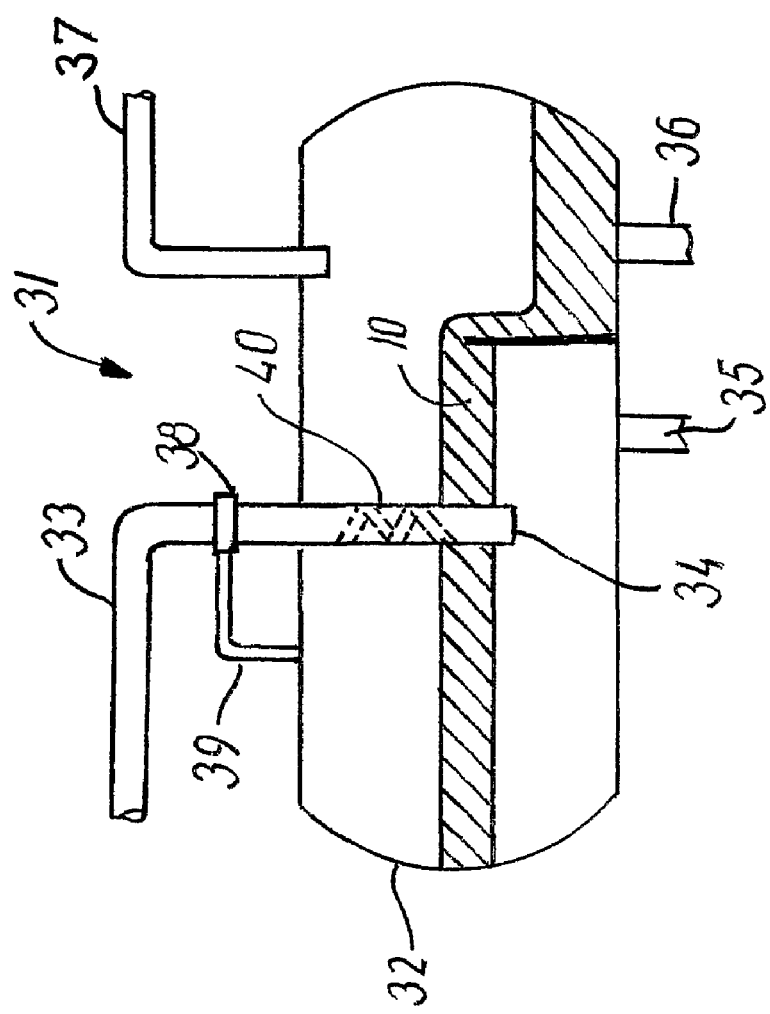
FIG. 3 illustrates an alternative embodiment of a separator according to the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Reference is made to FIG. 1 where a gravity separator 1 is shown with a vessel 2 with an inlet duct 3 having a vessel entrance 4 located within vessel 2. The inflow of fluid mixture through entrance 4 spread itself freely into the vessel where gravity acts on the constituents in the mixture. The vessel 2 is further equipped with an outlet for water 5, an outlet for oil 6, and an outlet for gas 7. Within vessel 2 a weir plate 8 is provided that serves to separate water phase 9 from oil phase 10. Gas phase 11 is collected at the location in the space above the water phase 9 and the oil phase 10.

In the inlet duct 3 of the vessel 2 is mounted an injector means 12 in form of a nozzle device for gas injection. The nozzle device is fed with a gaseous medium via line 13. In this manner the gaseous medium is injected into the mixture containing water, oil and gas in the inlet duct 3 before the mixture enters the vessel 2 via vessel entrance 4.

The vessel is preferably a horizontal, substantially cylindrical vessel 2 closed at both ends, preferably with curved or convex closings. Vessel 2 and attached equipment can be made from suitable metallic alloys, preferably stainless alloys. Vessel 2 is preferably assembled by welding.

The mixture containing water, oil and gas has a liquid appearance, which may be more or less viscous depending on the ratio between water and oil. The gas normally disperses in the mixture as tiny bobbles. The mixture containing water, oil and gas may contain further constituents, e.g. impurities from an oil well. The mixture may also contain solids. Possible solids in the mixture will normally leave the separator with the water phase.

In an embodiment the injector means is one or more nozzles. The nozzle may be any nozzle suitable to inject a gaseous medium into the mixture comprising water, oil and gas. Conveniently, the nozzle is capable of operating at pressures in the range of 5 to 250 atm.

Although the gravity separator may have any desired size, the vessel preferably has an internal volume in the range of 1 to 200 $m^3$, such as 3 to 100 $m^3$ in order to optimise the input/output ratio.

In one embodiment the gravity separator comprises means to separate the water phase from the oil phase. The means are mainly physical means like weir plates and the like, which may be located at the bottom part of the vessel preventing access of the water phase to a certain zone in the vessel, but allowing oil to flow into that zone, and optionally, the outlet for oil is placed in this zone.

The internal portion of vessel 2 may also be equipped with one or more baffles and/or guide vanes to obtain a desired flow or stream in the vessel, which may improve the separation capacity of the gravity separator.

The gravity separator may comprise further means for injection of separation aids. The separation aids are mainly in liquid form, e.g. flocculants, emulsifiers, etc. Injection of such separation aids may further improve the separation under gravity. The separation aids may be injected in the inlet duct or in the vessel or in both.

The gaseous medium may be any gas suitable to facilitate the separation of water, oil and gas in the mixture. However, in an example according to the invention the gaseous medium is selected from nitrogen, hydrogen, natural gas, carbon dioxide and mixtures thereof. Natural gas is normally the gas that may be extracted from an oil well. When natural gas is chosen as the most preferable gaseous medium part, the extracted natural gas from the oil well may be recycled as the gaseous medium. In this manner, the gaseous medium may be obtained in a simple and cost-effective manner.

After the gaseous medium has been injected into the mixture, it may later be re-extracted, mainly from the gas phase, and/or re-circulated into the separation system.

According to the present invention the injector means for gas can be installed in the inlet ducts of existing gravity separation tanks, thereby modifying and improving the capacity of the existing separation tanks. Thus the benefit of the present invention can be applied on gravity separator already installed and in use, e.g. on an oil producing plant which may be located onshore or offshore.

The injector means may be one or more suitable nozzles, which may conveniently be arranged in an annular shaped device.

FIGS. 2a and 2b show a nozzle device 20 suitable for use in the invention. The nozzle device consists substantially of an annular flange 21. The inner peripheral surface 22 of the flange 21 is equipped with a number of holes 23 (in this depicted embodiment eight holes 23). The holes 23 communicate with a channel 24 within the flange 21 (the channel 24 is shown with dotted lines in FIG. 2 b). The channel 24 further communicates with a supply line 25 for the gaseous medium, which is fastened to the outer peripheral surface 26 of the flange 21. The nozzle device 20 is capable of providing a good mix of the mixture and the gaseous medium in the inlet duct 3 (FIG. 1).

FIG. 3 depicts an alternative embodiment of the gravity separator according to the invention. As in the embodiment of the gravity separator shown in FIG. 1, the alternative gravity separator 31 comprises a vessel 32. The separator 31 is also equipped with an inlet duct 33 communicating with the interior of the vessel 32 via vessel entrance 34, an outlet for water 35, an outlet for oil 36 and an outlet for gas 37. A nozzle device 38 is located in the inlet duct 33 and fed with gas via a pipeline 39 from the interior of the vessel 32. In the inlet duct 33 after the nozzle device 38 and in the vicinity of the vessel entrance 34 a static mixer 40 is arranged to ensure good mixing of the mixture entering the vessel 32 via vessel entrance 34. In this embodiment the gaseous medium is taken directly from the gas separated in the vessel 32 and extra supply of the gaseous medium can be avoided.

As mentioned, the drawings are only schematic, and for the reasons of simplicity, means like pumps, valves, pressure-sensors, collecting vessels for oil and gas etc. have not been illustrated. The gravity separator and the method according to the present invention can be modified within the scope of the appended patent claims. Details of the various embodiments can be combined into new embodiments within the scope of the patent claims. It is e.g. possible to provide an individual separator with two or more outlets for oil and/or with two or more outlets for water and/or with two or more outlets for gaseous medium and/or with two or more inlet ducts or entrance openings. One or more of the outlets can be provided with a valve. The injector means in the inlet can be combined with a pump in the conduit for withdrawing gas from upper portion of the vessel. Such an embodiment is however less favourable because it is more complicated and not an automatic, self-regulating system which is independent from outside supplies and has no moving parts.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A gravity separator comprising a vessel within which a mixture containing water, oil, and gas can separate under gravity to form vertically discrete oil and water layers and a gas phase, the vessel including
    an inlet duct communicating with a vessel entrance for the mixture containing water, oil, and gas;
    an outlet for water;
    an outlet for oil; and
    an outlet for gas,
    said inlet duct (i) including a gas injector spaced apart from the vessel entrance by a spacing in a range of from 0.05 to 2.00 m, and (ii) extending from above the vessel downward through the vessel to the vessel entrance.

2. The gravity separator according to claim 1, further comprising a conduit that supplies a gaseous medium to the gas injector by recirculating gas from the gravity separator to the gas injector.

3. The gravity separator according to claim 2, wherein the conduit supplying the recirculated gas to the gas injector is connected with an interior of the gravity separator at an upper part thereof.

4. The gravity separator according to claim 2, wherein the conduit supplying the recirculated gas to the gas injector is a sole supply of injection gas to the gas injector.

5. The gravity separator according to claim 1, further comprising a mixer located in the inlet duct between the gas injector and the vessel entrance.

6. The gravity separator according to claim 5, wherein the mixer is a static mixer.

7. The gravity separator according to claim 5, wherein the mixer is located in a section of the inlet duct extending within the vessel.

8. A method of separating a mixture containing water, oil, and gas comprising the steps of:
    conducting the mixture via an inlet duct and a vessel entrance into a vessel, the inlet duct extending from above the vessel downward through the vessel to the vessel entrance;
    injecting a volume of a gaseous medium in a range of from 0.01-1.9 $Sm^3$ of the gaseous medium per 1 $m^3$ of the mixture into the mixture flowing through the inlet duct, the gaseous medium being injected through a gas injector spaced apart from the vessel entrance by a distance of from 0.05 to 2.00 m;
    allowing the mixture in the vessel to separate into a water phase, an oil phase, and a gas phase under gravity; and
    taking out the water phase via an outlet for water, taking out the oil phase via an outlet for oil, and taking out the gas via an outlet for gas.

9. The method according to claim 8, wherein 0.04-1.6 $Sm^3$ of the gaseous medium per 1 $m^3$ of the mixture is injected into the mixture in the inlet duct.

10. The method according to claim 9, wherein 0.05-0.40 $Sm^3$ of the gaseous medium per 1 $m^3$ of the mixture is injected into the mixture in the inlet duct.

11. The method according to claim 9, wherein 0.05-0.15 $Sm^3$ of the gaseous medium per 1 $m^3$ of the mixture is injected into the mixture in the inlet duct.

12. The method according to claim 9, wherein 0.08-0.12 $Sm^3$ of the gaseous medium per 1 $m^3$ of the mixture is injected into the mixture in the inlet duct.

13. The method according to claim 9, wherein the mixture containing water, oil, and gas is subjected to injection with one or more separation aids.

14. The method according to claim 9, wherein the gaseous medium is a gas collected from the vessel and injected in the inlet duct.

* * * * *